US012028219B2

United States Patent
Hembram

(10) Patent No.: US 12,028,219 B2
(45) Date of Patent: Jul. 2, 2024

(54) REAL-TIME INTELLIGENT SYSTEM MAPPING

(71) Applicant: Bank of America Corporation, Charlotte, NC (US)

(72) Inventor: Pragyan Paramita Hembram, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 407 days.

(21) Appl. No.: 17/591,728

(22) Filed: Feb. 3, 2022

(65) Prior Publication Data

US 2023/0246917 A1    Aug. 3, 2023

(51) Int. Cl.
*H04L 41/12* (2022.01)
*G06N 3/02* (2006.01)
*H04L 9/32* (2006.01)

(52) U.S. Cl.
CPC .............. *H04L 41/12* (2013.01); *G06N 3/02* (2013.01); *H04L 9/3213* (2013.01)

(58) Field of Classification Search
CPC ......... H04L 41/12; H04L 9/3213; G06N 3/02; G06N 3/045; G06N 3/08
See application file for complete search history.

(56) References Cited

U.S. PATENT DOCUMENTS

| | | | | |
|---|---|---|---|---|
| 10,826,801 | B1* | 11/2020 | Narayanan | H04L 43/028 |
| 11,531,687 | B2* | 12/2022 | Dowler | G06F 16/24553 |
| 2019/0034425 | A1* | 1/2019 | Jain | G06Q 10/063112 |
| 2023/0004424 | A1* | 1/2023 | Represas | G06Q 40/03 |

* cited by examiner

*Primary Examiner* — Hashim S Bhatti
(74) *Attorney, Agent, or Firm* — Weiss & Arons LLP

(57) ABSTRACT

Systems, methods, and apparatus are provided for system mapping based on processing of custom network packets. A token processor may deploy a network agent to a system of record (SOR). The network agent may scan the SOR and extract SOR metadata through a set of API calls. The network agent may aggregate the SOR data and generate a token according to parameters established by the token processor. The token processor may process the token through a neural network to generate a set of output vectors for the SOR. A system mapping engine may determine relationships between network SORs based on the output vectors and generate an integrated visual representation of enterprise systems. The output vectors may be adjusted based on new tokens received from the SOR and the visual representation may be updated in real time.

21 Claims, 6 Drawing Sheets

REAL-TIME INTELLIGENT SYSTEM MAPPING

FIELD OF TECHNOLOGY

Aspects of the disclosure relate to mapping system environments using custom network packets.

BACKGROUND OF THE DISCLOSURE

An enterprise may maintain multiple systems of record (SOR) in a variety of linear or non-linear configurations. Each SOR may draw from a variety of data sources. Additionally, data may be modified or customized within each SOR before being passed downstream.

Conventional methods for tracking the content and interrelations of system components involve manual periodic overview of system environments and reconciliation of system data. This lack of real-time system awareness may lead to a range of inefficiencies. For example, cloud computing capabilities render it easy to spin up new environments which may duplicate existing SOR functions. Some SORs may be maintained even though very little activity takes place in the environment. SORs throughout the enterprise may receive uniform application configurations even though customizations based on specific functionalities may be in the best interest of the enterprise.

It would be desirable to capture information from across the network and develop an integrated map of system environments that is updated in real time. It would be desirable to generate a comprehensive, searchable visual representation of system capabilities for ongoing system awareness and rebalancing of enterprise priorities based on the available resources.

SUMMARY OF THE DISCLOSURE

Systems, methods, and apparatus for real-time intelligent system mapping are provided.

A token processor may detect an SOR by monitoring network traffic. The token processor may deploy a network agent to the SOR.

The network agent may identify background data associated with the SOR. The network agent may implement a series of requests based on the background data. The network agent may extract SOR metadata and generate a custom token.

The token processor may break down tokens received from the SOR. Token data may be input to a neural network. The neural network may output a set of vectors for the SOR.

A system mapping engine may determine SOR data usage based on the output vectors. The system mapping engine may determine SOR data transmission based on the output vectors. The system mapping engine may determine a hierarchical relationship between network SORs based on the output vectors.

The system mapping engine may generate a searchable visual representation of the network based on relationships between network SORs. The vector outputs for an SOR may be updated in response to new tokens transmitted by the network agent. The visual representation may be modified based on the updated vector outputs.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
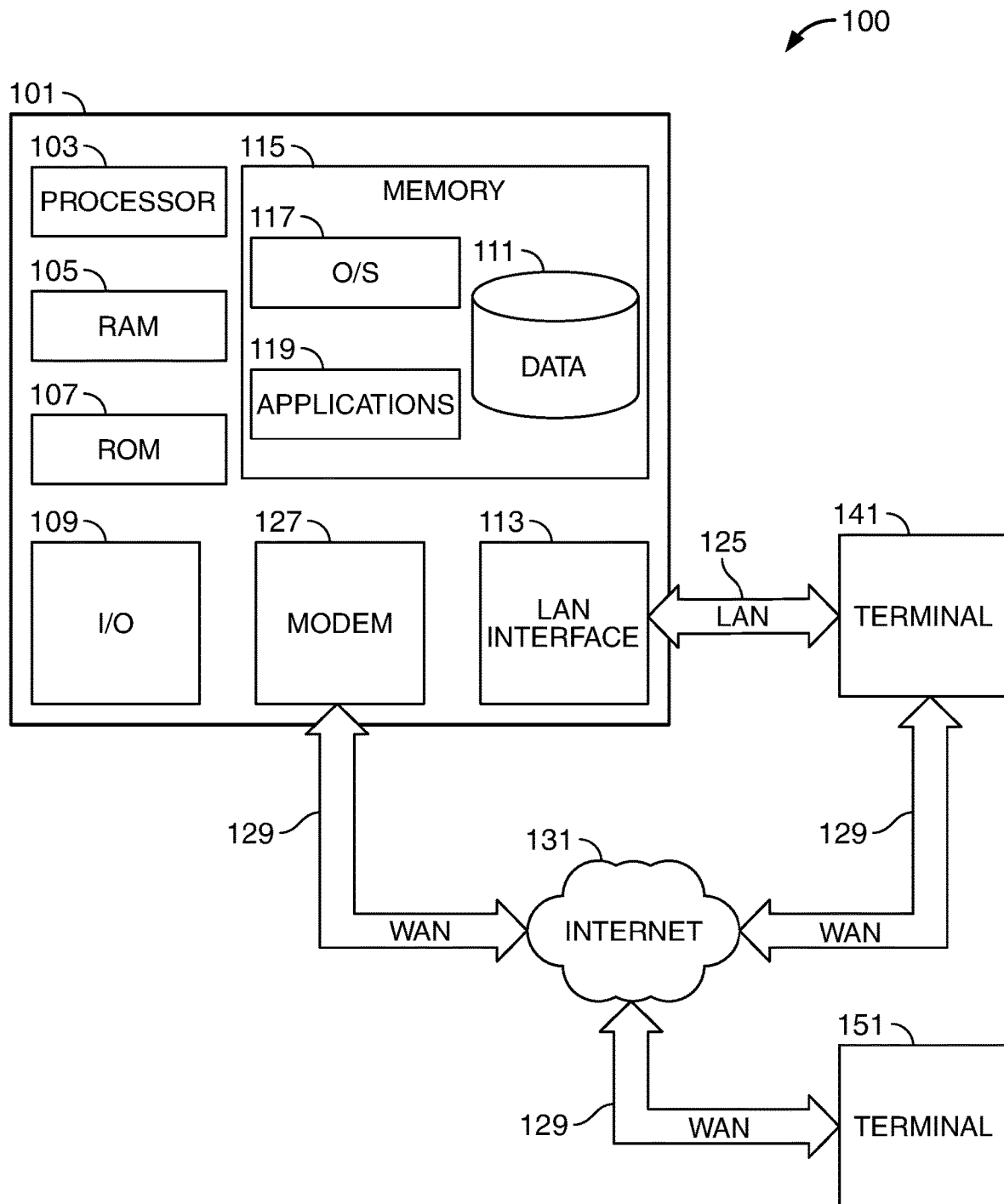
FIG. 1 shows illustrative apparatus in accordance with principles of the disclosure.

Systems, methods, and apparatus for real-time intelligent system mapping are provided.

Conventional oversight of business network environments may require periodic manual review of data usage, data transmission, and data transformation, as well as reconciliation across the network. However, even using these manual audit measures, it is difficult to identify systems performing duplicate functions and to pinpoint exactly where data quality is diluted. Both network efficiency and network security would be improved by the ability to access real-time comprehensive system mapping.

A network agent may be deployed to enterprise SORs. The network agent may extract SOR metadata and encode the data structures and data composition of the SOR into a custom token. A central processor may use an array of neural networks to break down the token to determine the usage and purpose of the SOR as well as the upstream and downstream transactions. Data transmission may be tracked through other systems and sub-systems in order to represent the entire system integration setup in real time.

For the sake of illustration, the invention will be described as being performed by a "system." The system may include one or more features of the apparatus and methods that are described herein and/or any other suitable device or approach.

The system may include a token processor. The token processor may detect an SOR that is active on the network. The token processor may monitor network traffic. The token processor may detect the SOR by scanning for IP addresses of network devices or by any suitable method.

The token processor may deploy a network agent to the SOR. The network agent may remain in communication with the token processor. The network agent may be designed using a language compatible with a wide variety of operating systems such as R or Scala. R is a programming language for statistical computing. Scala is a general-purpose programming language which supports both object oriented and functional programming.

The token processor may define token policy for the network agent. Token policy may refer to parameters for data gathered by the network agent. The token processor may instruct the network agent regarding capture of metadata pointers to map the usage and data transmission patterns for the SOR. The token content may be customized based on the specific needs of the enterprise, building flexibility into the mapping process.

The token parameters established by the token processor may be dictated by network capabilities. Token transmission by the network agent requires network bandwidth so the parameters may be limited to strictly necessary data. The open framework of the network agent may be adaptable to create tokens for different environments. The network agent may be instructed to use different application programming interface (API) calls based on the information required. An API may act as an intermediate layer that processes data transfers between systems.

Any suitable data may be extracted by the network agent. Initially, the network agent may perform a high-level scan of the SOR to identify basic parameters such as the operating system and build. The network agent may choose API requests based on the system parameters.

Data extracted by the network agent may relate to physical existence of the SOR. Physical existence may be determined from the date of initialization of the system or by any suitable method.

Data extracted by the network agent may relate to upstream and downstream data links to the SOR. SOR data may be received from online sources or collected from other systems. Data sources may be identified by the metadata associated with a batch job or online processing, which may be accessed via a system log. The API may be written to access the log with the most recent time stamp.

Data extracted by the network agent may relate to data components such as field types, field consistency, and field composition. For example, in a database system, the network agent may identify an array of tables and use the primary fields to determine the type of data being captured by the SOR. Information extracted from an SOR log regarding batch or online processing may be combined with time stamps for field entries to determine whether the fields are updated automatically or updated manually. This information may be used to identify the data composition for the SOR.

Data extracted by the network agent may relate to encryption and decryption methods for the SOR. Encryption methods may be determined by monitoring calls made to the system as well as online processing jobs. The network agent may access a list of bad jobs to identify security issues.

The network agent may generate a custom network packet from the SOR metadata. The network packet may be a token that encodes the SOR data and conforms to parameters established by the token processor. The network agent may transmit the token to the token processor. The network agent may continue to monitor the SOR and may generate additional tokens. New tokens may be generated at predetermined intervals or may be generated in response to new data. The network agent may aggregate a set of tokens for transmission.

The token processor may receive a token from the network agent. The token may be processed through one or more artificial neural networks. The neural networks may be any suitable deep learning classifiers, such as a long-short term memory network ("LSTM") or any other suitable network.

Deep learning classifiers typically utilize a layered structure of algorithms known as artificial neural networks to create a non-linear, multi-dimensional classification model. An artificial neural network encompasses layers of neurons, each neuron taking one or more inputs and producing an output. The output is based on the values of the inputs as well as a weight associated with each input value. A bias constant also limits the inputs. Typically, the weights increase the steepness of the activation function dictating how quickly the activation function triggers, while bias delays the trigger of the activation function. Neural networks typically use a sigmoid activation function for non-linear mapping of input values.

An artificial recurrent neural network (RNN) uses internal memory, for problems involving sequential data. RNNs may loop outputs back into the network, allowing them to adjust the weighting and bias factors based on training data. Long Short Term Memory (LSTM) networks are a type of RNN with an extended memory. LSTM networks are well-suited to classifying, processing and making predictions based on time series data, since there can be lags of unknown duration between important events in a time series.

LSTM networks may keep track of arbitrary long-term dependencies in input sequences. LSTM cells may be composed of a cell, an input gate, an output gate and a forget gate. The cell remembers values over arbitrary time intervals and the three gates regulate the flow of information into and out of the cell. An LSTM network may enable the system to continually adjust outputs in response to receipt of new tokens with updated system data for an SOR.

The neural networks may include an input layer. At the input layer, a token received from the network agent is verified to determine that it meets the parameters established by the token processor. Token parameters established by the token processor define the input stack for the neural network. The tokens may be preprocessed and broken down to access the information from the SOR.

The neural networks may include an input tree embedding layer. At the input tree embedding layer, an algorithm framework may be applied to encode the structured information into vector representations for machine processing. The vectors may be defined based on output time for the token and may be updated with further processing and training of the neural network. An exemplary algorithm is shown below in Equation 1.

$$O(t)=\sigma(W(i)[O(t-1),I(t-2),x(t)]+b(t)) \qquad \text{Eq. 1:}$$

Where:
O(t) is the output at time t;
I(t−2) is the input value of an SOR obtained from the preprocessing phase;
x(t) is a time input applied to the equation to produce real-time outputs;
O(t−1) is input from a previous timestamp to determine if the output vector for the SOR has changed in the interval;
b(t) is the bias vector parameter which is defined during the training process; and
W(i) is the weight matrix which is also defined during the training process. Inputs are multiplied by the weights before feeding into the hidden layers of the network.

Input data extracted from the SOR may be compared over time in order to generate the vectors. The bias factor may be adjusted to prioritize environments that see more activity over time. Bias may also be adjusted based on enterprise priorities or other network factors. Weight may be based on the time stamp for the data. For example, an environment may be accorded a weight based on how recently the data was obtained. The latest time may be added as one of the vectorized components to identify the latest token coming out of the environment.

The neural networks may include an attention layer. At the attention layer, latent vectors may be successively carried forward for further enhancement. The neural networks may include a decoder layer. At the decoder layer, the final notations for the SOR may be extracted. The decoder may improve the generated vector in a cumulative fashion. The neural networks may include an output tree extraction layer.

At the output tree extraction layer, a representation of the SOR and its relationships may be determined.

A system mapping engine may receive output vectors from the token processor. The system mapping engine may align the output vectors to determine the relationship between SORs.

The system mapping engine may use a set of comparison algorithms to update relationships between SORs, based on the new vector outputs. Illustrative factors that may be considered by the system mapping engine may include successor/predecessor, origin time/updated time, metadata core composition, derived fields and original fields, transaction details, sensitivity score of the data, and reusability/data growth of the environment. The comparison algorithms may be written in R or in any suitable language.

In addition to determining the hierarchical relationships between SORs, the system mapping engine may identify a percentage of data that is duplicated between systems. The system mapping engine may generate a replication ratio for data tracked between SORs.

The system mapping engine may include a control dashboard. The system mapping engine may generate a visual representation of the enterprise systems for display on the dashboard. The visual representation may combine data from SORs across the enterprise network to form an integrated map of enterprise systems.

The representation may show data usage for each environment. The representation may show data transmission between environments. The representation may show a hierarchical arrangement of parent and child systems. The representation may show data transformations within a SOR. The representation may include replication ratios associated with data transmission. The visual representation may include an interactive user interface. The visual representation may be searchable.

The dashboard may track data lineage as well as transformations that occur at various points within the network. Integrated system mapping may improve control over data residing within the network as well as data flow between environments. Improved control allows for better defense against cyber threats and other security risks.

The dashboard may include a feedback loop. The dashboard may crosscheck the SOR data to ensure that every system continues to perform as expected. The feedback loop may also improve data quality by ensuring that data replication is controlled and monitored.

The system mapping engine may include a recommendation engine. The dashboard may proactively propose best use case architecture for the available systems and subsystems. The recommendation engine may evaluate the existing system environments based on a predetermined set of rules. The recommendation engine may identify environments performing duplicate functions. The recommendation engine may identify environments that compromise data security. The recommendation engine may identify an environment that no longer meets a threshold level of activity. The threshold may be customized by a user.

For example, a token may include information related to a security matrix in a parent system. Based on batch processing records, online processing records, and a list of bad jobs accessed by the network agent, the recommendation engine may determine that the existing security matrix needs to be upgraded. Alternatively, the recommendation engine may determine that there are only a few data feeds into the system and the security matrix may be downgraded.

The recommendation engine may be interactive. The dashboard may determine whether there is a need for a new environment or whether existing environments already fill the need. A user may input a data processing request, for example, mapping human resources information to finance information. The recommendation engine may determine whether a suitable SOR exists, identify the SOR data composition, and determine whether the environment has the capability to execute the data processing request.

One or more non-transitory computer-readable media storing computer-executable instructions are provided. When executed by a processor on a computer system, the instructions may perform a method for system mapping based on processing of a custom network packet.

The method may include a token processor deploying a network agent to an SOR. The network agent may extract SOR metadata using a series of API calls and generate a custom token according to parameters dictated by the token processor.

The method may include receiving the token at the token processor. The method may include a neural network generating a set of vector outputs from the token data.

The method may include a system mapping engine determining SOR data usage based at least in part on the set of vector outputs. The system mapping engine may determine SOR data transmission based at least in part on the set of vector outputs. The system mapping engine may generate a searchable graphical representation that includes the SOR data usage and SOR data transmission information.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone, or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of generating a network agent, scanning an SOR, extracting SOR metadata, generating a token, processing a token, tracking data lineage, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
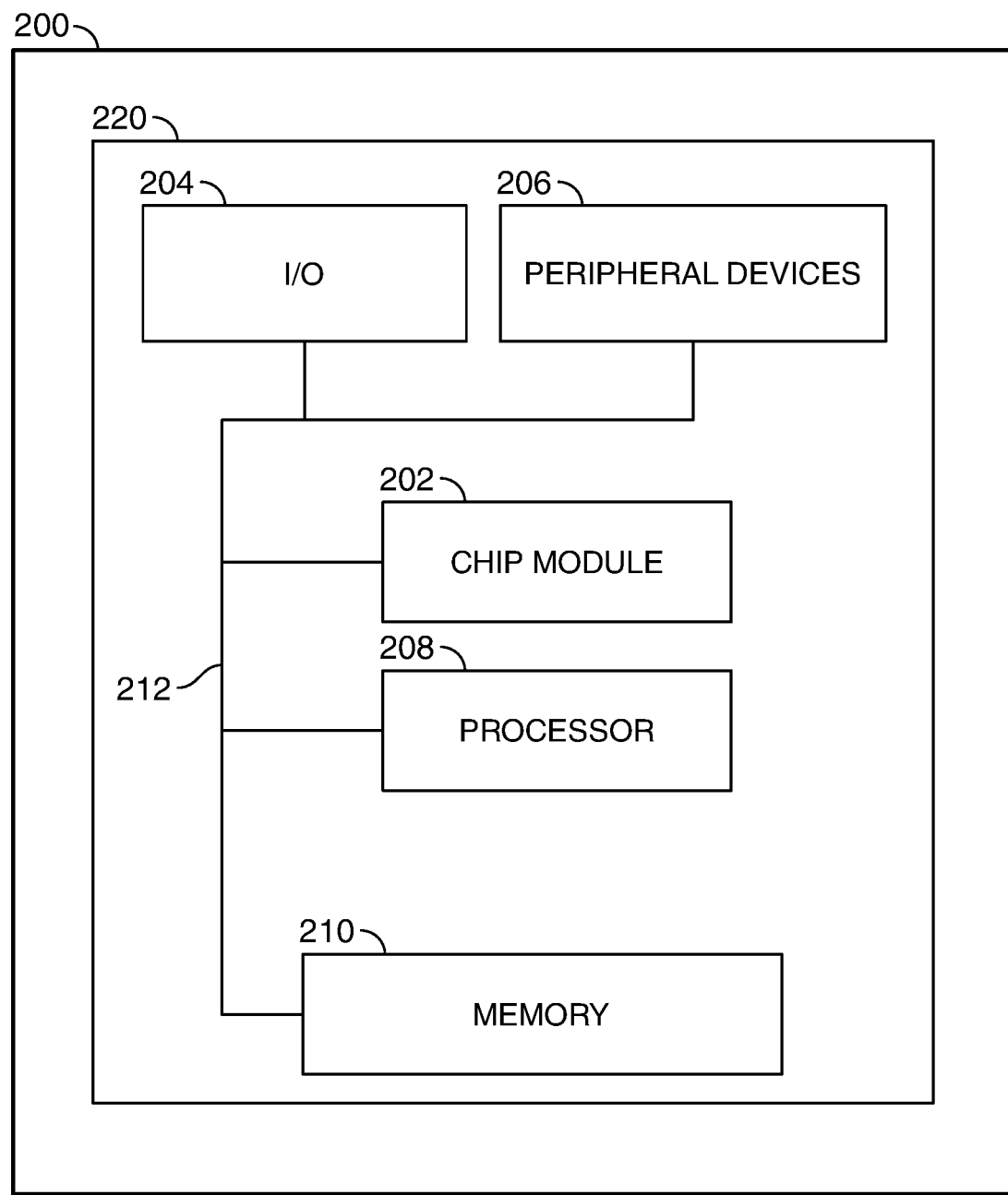
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may generate a network agent, scan an SOR, extract SOR metadata, generate a token, process a token, track data lineage, and perform other methods described herein; and machine-readable memory 210.

Machine-readable memory 210 may be configured to store in machine-readable data structures: SOR metadata, aggregated token data, output vectors, SOR data usage, SOR data transmission, data lineage, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
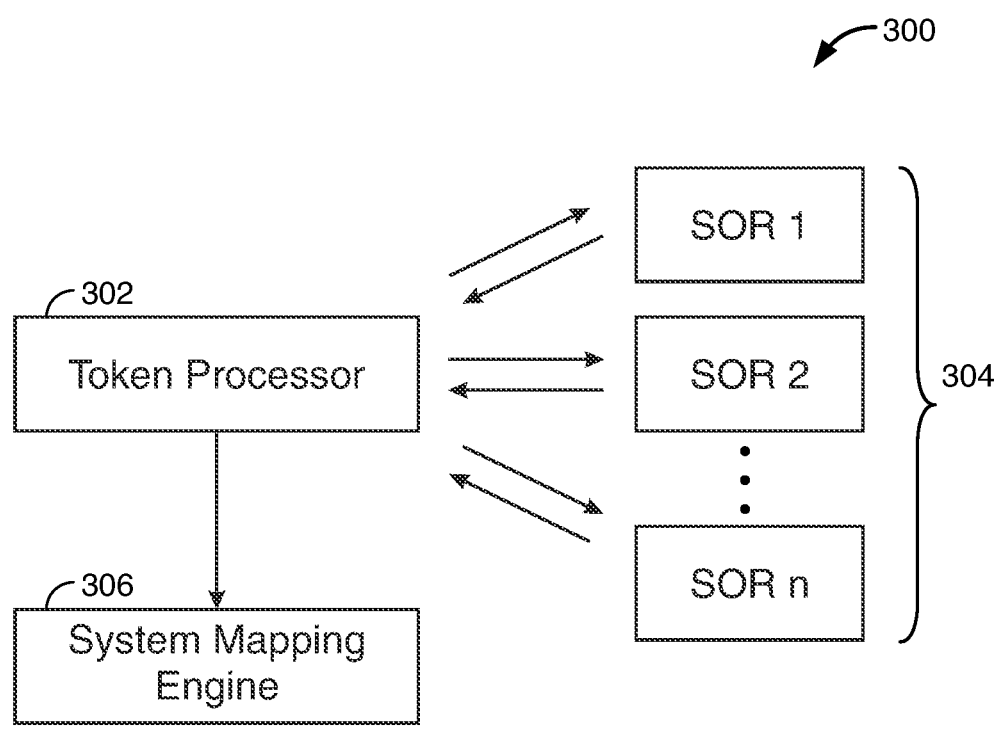
FIG. 3 shows illustrative system architecture in accordance with principles of the disclosure.

FIG. 3 shows high-level system overview 300. Token processor 302 may deploy network agents to SORs 304 detected on the network. Token processor 302 may continually scan network traffic and may identify network components by their IP addresses or by any suitable method. The network agent may mine SOR metadata according to parameters established by token processor 302. The network agent may generate a token from the SOR metadata.

Token processor 302 may break down the token to generate output vectors for the SOR. System mapping engine 306 may determine relationships between SORs based on the output vectors. System mapping engine 306 may generate an integrated representation of the entire enterprise system based on the relationships between SORs.

Figure 4:
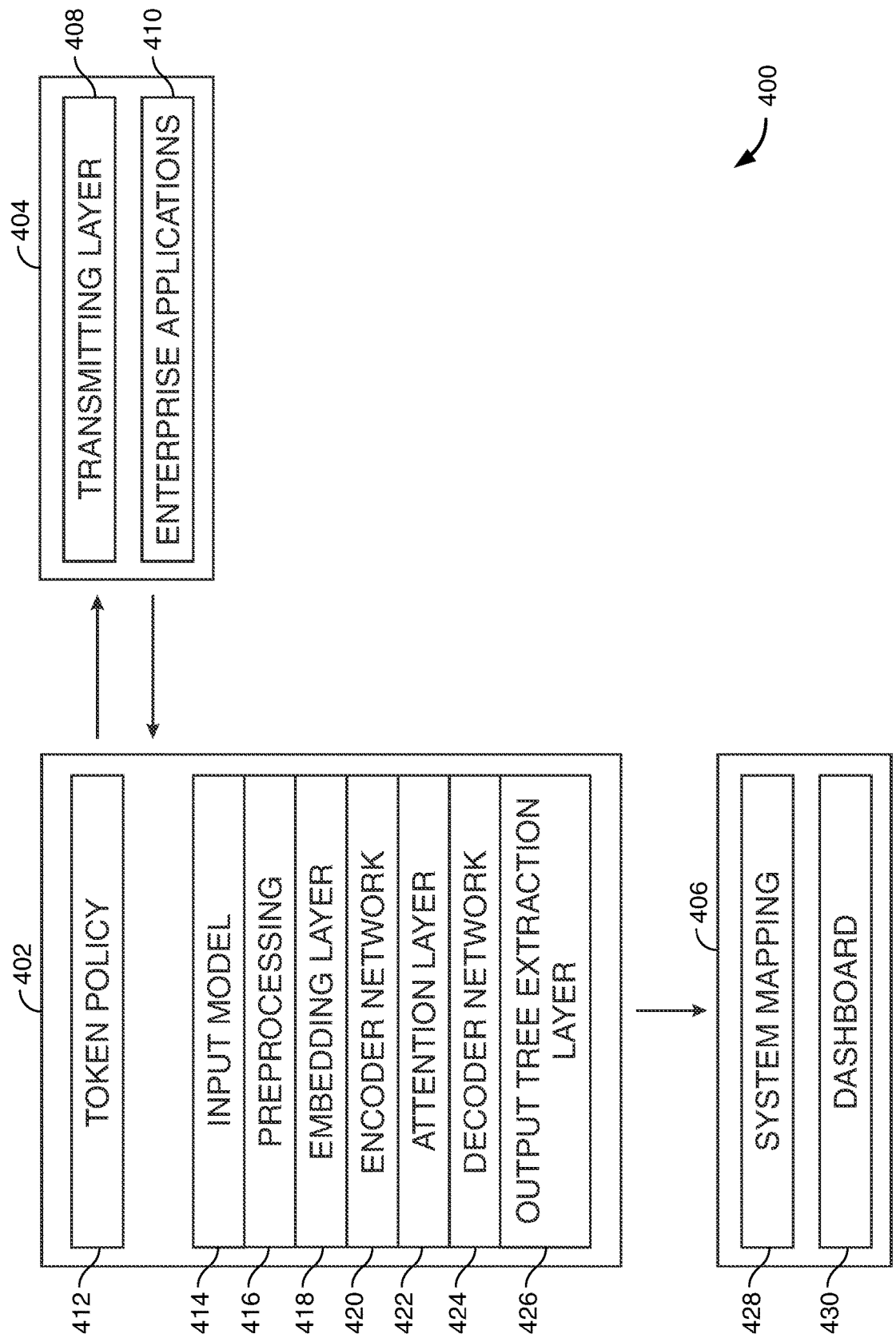
FIG. 4 shows another view of system architecture in accordance with principles of the disclosure.

FIG. 4 shows illustrative process flow 400. Elements of process flow 400 may correspond to elements of process flow 300, shown in FIG. 3.

Token processor 402 may correspond to token processor 302, shown in FIG. 3. Token processor 402 may determine token policy 412 and generate instructions for a network agent based on token policy parameters. Token processor 402 may deploy a network agent to SOR 404. SOR 404 may correspond to SOR 304, shown in FIG. 3. The network agent may request data from SOR enterprise applications 410 to generate the token. Transmitting layer 408 may transmit the token to token processor 402.

Token processor 402 may include neural networks for processing the token. At steps 414-426, the token input may be preprocessed and then vectorized by a LSTM neural network.

Output vectors from token processor 402 may be transmitted to system mapping engine 406. System mapping engine 406 may correspond to system mapping engine 306, shown in FIG. 3. System mapping 428 may use the output vectors to map SOR data usage and data flow between SORs. Dashboard 430 may include a searchable visual representation of hierarchical system relationships.

Figure 5:
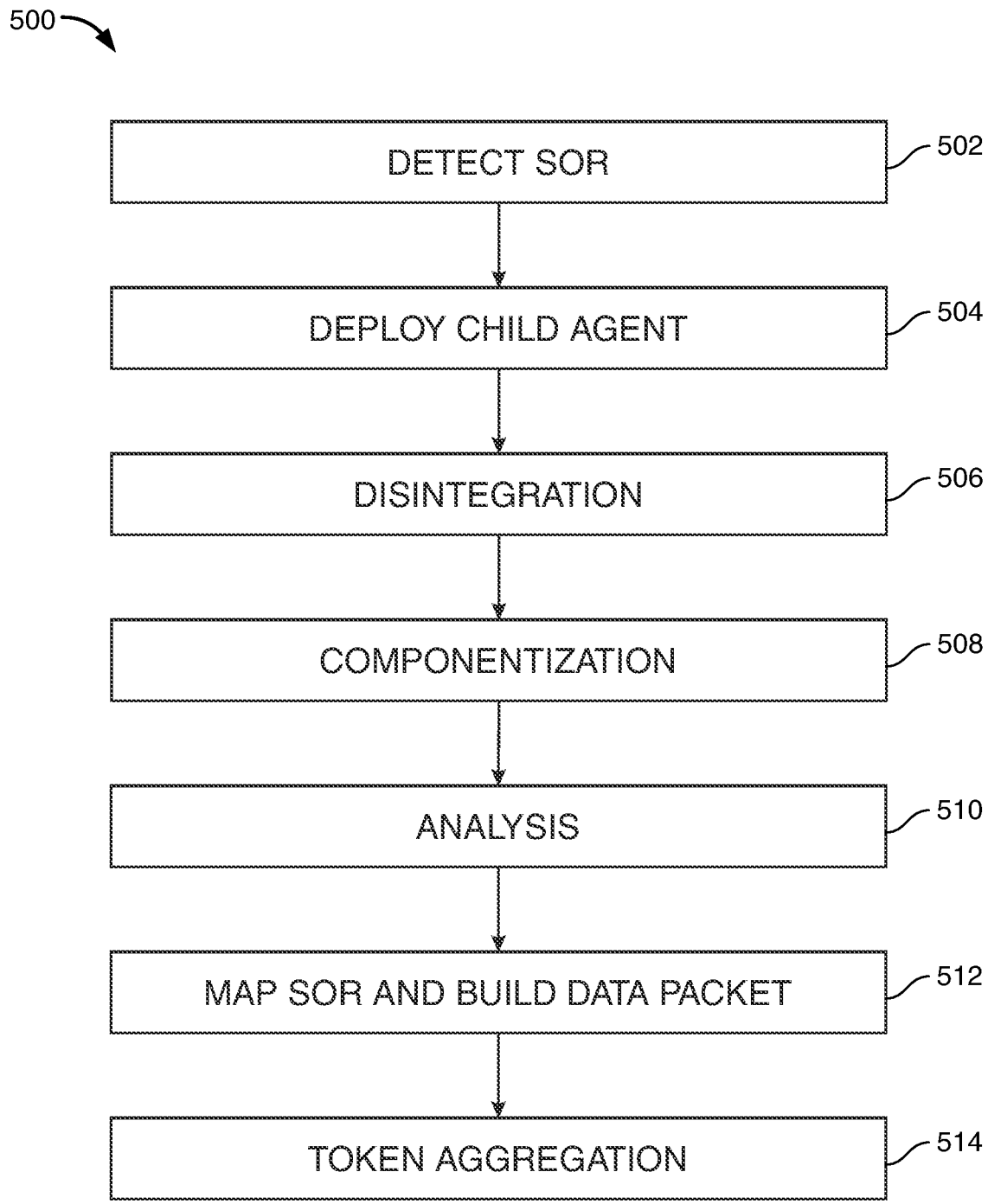
FIG. 5 shows an illustrative process flow in accordance with principles of the disclosure.

FIG. 5 shows illustrative process flow 500 for a network agent deployed to an SOR. At step 502, a token processor detects an SOR by monitoring network traffic. At step 504, a child agent is deployed to the SOR. At step 506, the child agent collects SOR data using a series of API calls or via any suitable method. At step 508, the child agent aligns the extracted data based on token parameters. At step 510, the child agent checks the data against the parameters established by the token processor. At step 512, the child agent encodes the SOR data to generate a custom token. At step 514, the child agent aggregates the data packets that have been generated and transmits them to the network for processing.

Figure 6:
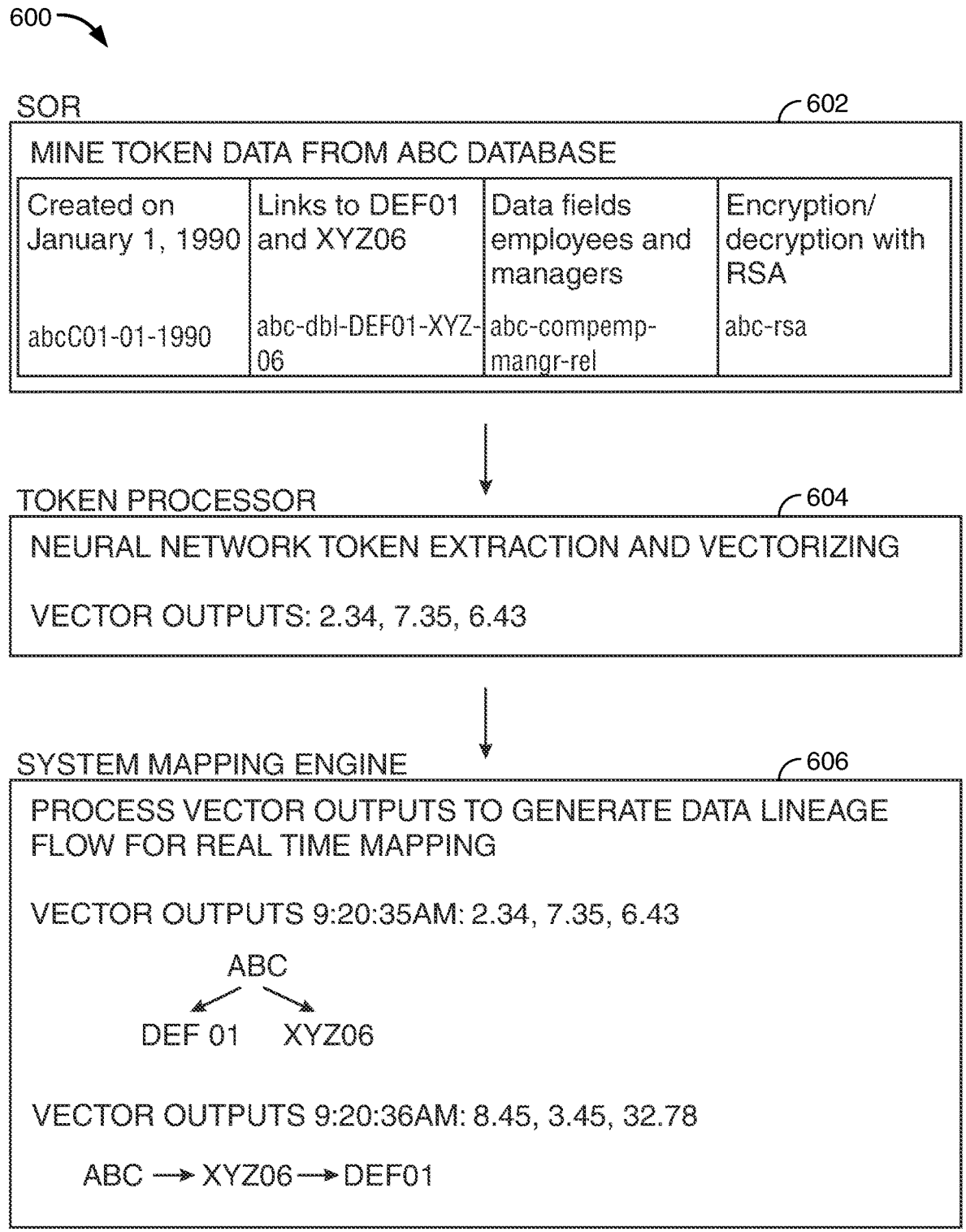
FIG. 6 shows an illustrative process flow in accordance with principles of the disclosure.

FIG. 6 shows illustrative process flow 600. Process flow 600 shows generating a token from SOR data and breaking down the token for system mapping. One or more elements of process flow 600 may overlap with elements of process flow 300, shown in FIG. 3, process flow 400, shown in FIG. 4 and process flow 500, shown in FIG. 5.

Step 602 shows illustrative network agent data mining activity at a hypothetical SOR database. The illustrative data includes existence data obtained from the initialization date for the SOR. The illustrative data includes data links, obtained from data logs or other system records of batch or online processing. The illustrative data includes usage data obtained from data field activity in the database. The illustrative data includes encryption data. The network agent may generate a custom token and transmit the data packet to a token processor.

Step 604 shows token processor activity processing the token. The token processor may use neural networks to break down the token and generate output vectors for the SOR. The token processor may continue to process incoming tokens from the SOR.

Step 606 shows a system mapping engine processing the output vectors to determine relationships between SORs. A first hierarchy is mapped based on the set of output vectors generated at 9:20:35 AM. A second set of output vectors is mapped based on the set of out output vectors generated one second later at 9:20:36 AM. The LSTM neural network may adjust vectors based on updated token data and the system mapping engine may covert the vector outputs to a real-time map of the system.

Thus, methods and apparatus for REAL-TIME INTELLIGENT SYSTEM MAPPING are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing system mapping based on a custom token encoding System of Record (SOR) data, the token generated by a network agent deployed to the SOR, the method comprising:
a token processor:
monitoring network traffic and detecting an SOR on the network;
deploying a network agent to the SOR; and
receiving a token comprising a custom packet generated by the network agent, the token comprising SOR metadata;
the network agent:
executing a series of Application Programming Interface (API) calls and extracting SOR metadata; and
aggregating the SOR metadata and generating the token;
a neural network generating a set of vector outputs from the token data; and
a system mapping engine:
determining SOR data usage based at least in part on the set of vector outputs;
determining SOR data transmission based at least in part on the set of vector outputs; and
generating a searchable graphical representation comprising the SOR data usage and SOR data transmission.

2. The method of claim 1, wherein the SOR is a first SOR and the data transmission comprises data transmission from the first SOR to a second SOR.

3. The method of claim 2, wherein the searchable graphical representation comprises a hierarchical relationship between the first SOR and the second SOR, the hierarchy based on the data transmission.

4. The method of claim 3, wherein the searchable graphical representation comprises a replication ratio for the data transmission from the first SOR to the second SOR.

5. The method of claim 1, further comprising the system mapping engine receiving a request for a processing function and determining whether an existing SOR is configured to perform the processing function.

6. The method of claim 3, wherein the token is a first token, the method further comprising:
the network agent generating a second token;
the neural network generating a second set of vector outputs from the second token; and
the system mapping engine:
identifying a change in the data transmission for the first SOR based at least in part on a difference between the first set of vector outputs and the second set of vector outputs; and
modifying the hierarchical relationship between the first SOR and the second SOR based on the change in data transmission.

7. The method of claim 1, further comprising the network agent:
scanning the SOR for one or more SOR parameters; and
selecting the set of API calls based on the SOR parameters.

8. The method of claim 1, further comprising the token processor customizing the network agent based on network bandwidth available for token transmission.

9. One or more non-transitory computer-readable media storing computer-executable instructions which, when executed by a processor on a computer system, perform a method for system mapping based on processing of a custom network packet encoding SOR metadata, the method comprising:
- a token processor:
  - deploying a network agent to the SOR; and
  - receiving a token comprising a custom network packet generated by the network agent, the token comprising SOR metadata;
- the network agent:
  - extracting SOR metadata; and
  - aggregating the SOR metadata and generating the token;
- a neural network generating a set of vector outputs from the token data; and
- a system mapping engine:
  - determining SOR data usage based at least in part on the set of vector outputs;
  - determining SOR data transmission based at least in part on the set of vector outputs; and
  - generating a searchable graphical representation comprising the SOR data usage and SOR data transmission.

10. The media of claim 9, wherein the SOR is a first SOR and the data transmission comprises data transmission from the first SOR to a second SOR.

11. The media of claim 10, wherein the searchable graphical representation comprises a hierarchical relationship between the first SOR and the second SOR, the hierarchy based on the data transmission.

12. The media of claim 11, wherein the searchable graphical representation comprises a replication ratio for the data transmission from the first SOR to the second SOR.

13. The media of claim 9, further comprising the system mapping engine receiving a request for a processing function and determining whether an existing SOR is configured to perform the processing function.

14. The media of claim 11, wherein the token is a first token, the method further comprising:
- the network agent generating a second token;
- the neural network generating a second set of vector outputs from the second token; and
- the system mapping engine:
  - identifying a change in the data transmission for the first SOR based at least in part on a difference between the first set of vector outputs and the second set of vector outputs; and
  - modifying the hierarchical relationship between the first SOR and the second SOR based on the change in data transmission.

15. The media of claim 9, further comprising the network agent:
- performing an initial scan for an SOR parameter; and
- selecting a set of API calls based on the SOR parameter.

16. The media of claim 9, wherein the network agent comprises an open source framework compatible with a plurality of SOR environments.

17. A system for mapping an environment based on processing of a custom token encoding SOR metadata, the system comprising:
- a token processor configured to:
  - deploy a network agent to the SOR; and
  - receive a token comprising a custom packet generated by the network agent, the token comprising SOR metadata;
- the network agent configured to:
  - extract SOR metadata; and
  - aggregate the SOR metadata to generate the token;
- a neural network configured to generate a set of vector outputs from the token; and
- a mapping engine configured to:
  - determine SOR data usage based at least in part on the set of vector outputs;
  - determine SOR data transmission based at least in part on the set of vector outputs; and
  - generate a searchable graphical representation comprising the SOR data usage and SOR data transmission.

18. The system of claim 17, wherein the SOR is a first SOR and the data transmission comprises data transmission from the first SOR to a second SOR.

19. The system of claim 18, wherein the searchable graphical representation comprises a hierarchical relationship between the first SOR and the second SOR, the hierarchy based on the data transmission.

20. The system of claim 19, wherein the searchable graphical representation comprises a replication ratio for the data transmission from the first SOR to the second SOR.

21. The system of claim 19, wherein the token is a first token and:
- the network agent is configured to generate a second token;
- the neural network is configured to generate a second set of vector outputs from the second token; and
- the mapping engine is configured to:
  - identify a change in the data transmission for the first SOR based at least in part on a difference between the first set of vector outputs and the second set of vector outputs; and
  - modify the hierarchical relationship between the first SOR and the second SOR based on the change in data transmission.

* * * * *